UNITED STATES PATENT OFFICE.

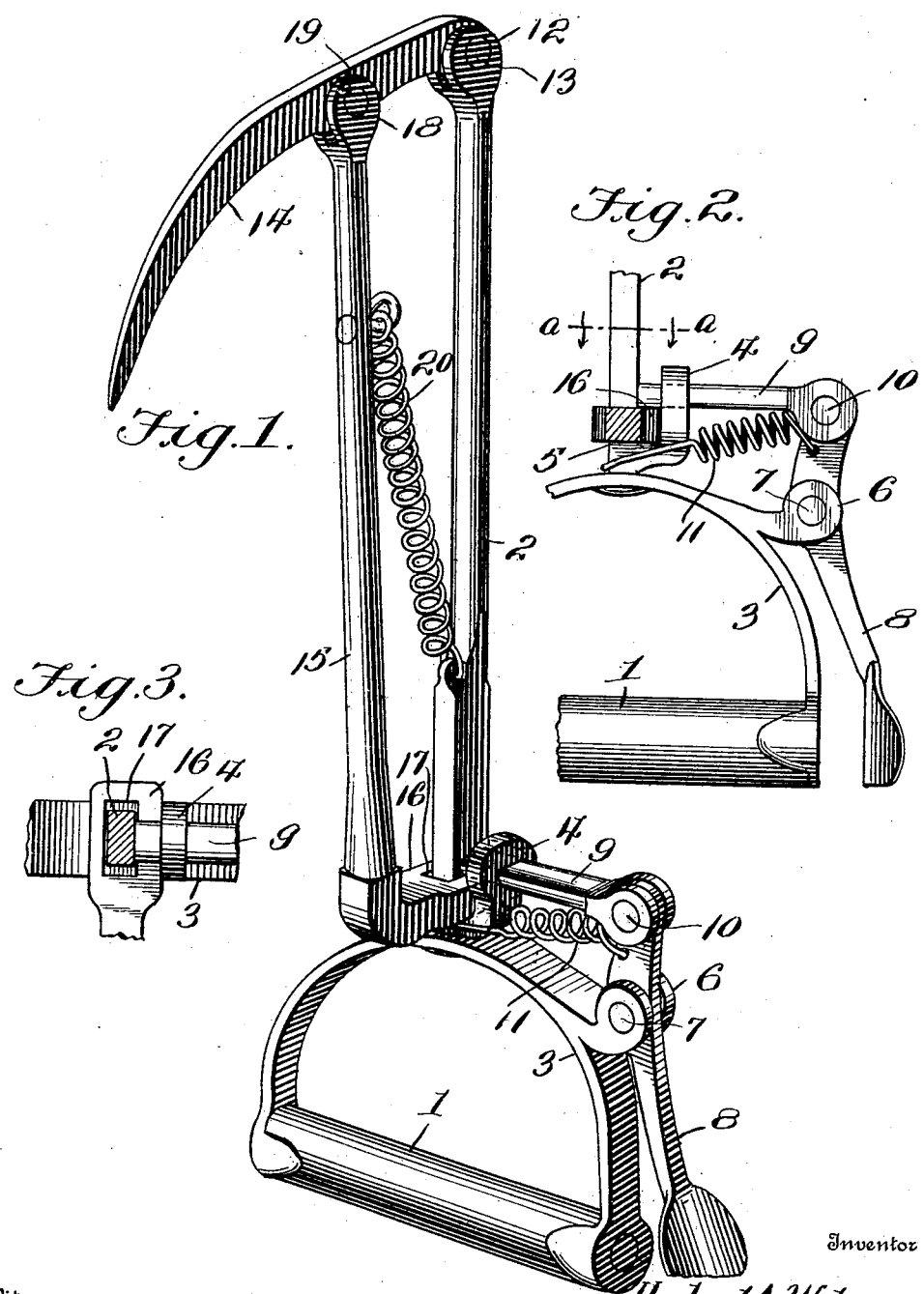

HERBERT A. WATERMAN, OF LIBERAL, MISSOURI.

HAND-HOOK.

No. 920,700.  Specification of Letters Patent.  Patented May 4, 1909.

Application filed December 29, 1908. Serial No. 469,858.

*To all whom it may concern:*

Be it known that I, HERBERT A. WATERMAN, a citizen of the United States, residing at Liberal, in the county of Barton and State of Missouri, have invented new and useful Improvements in Hand-Hooks, of which the following is a specification.

This invention is an improved hand hook adapted for use in handling bales of hay and other commodities, the object of the invention being to provide an improved hook of this kind with a pivoted bill and with means for releasing the bill in order to enable the hook to be readily disengaged from the bale.

The invention consists in the construction, combination and arrangement of devices hereinafter described and claimed.

In the accompanying drawings:—Figure 1 is a perspective view of a hand hook constructed in accordance with this invention showing the bill of the hook locked in position for use for engaging a bale. Fig. 2 is a detail elevation partly in section. Fig. 3 is a detail sectional view on the plane indicated by the line *a—a* of Fig. 2.

In the embodiment of my invention here shown, the stirrup shaped handle 1 is provided with a bar 2 which extends from the center of the arched side 3 thereof. The said arched side of the handle is provided with a guide lug 4 that is disposed at one side of the base of the bar 2 and is slightly spaced therefrom, the said lug having a shoulder 5 which forms a stop. The arched side of the handle is further provided at one side with a pair of lugs 6 between which is pivotally mounted as at 7, a thumb latch 8. A bolt 9 is pivotally connected at its outer end to the said thumb latch as at 10 and is guided in an opening in the guide lug 4. A spring 11 is provided which acts on the thumb latch 8 to keep the bolt normally in locking position as shown in the drawing.

At the outer end of the bar 2 is a pair of spaced lugs 12 between which is pivoted, as at 13, a bill 14 the outer portion of which is curved and brought to a point to facilitate its application to a bale. A rod 15 has at its inner end an angle arm 16 which is provided with an opening 17 through which the bar 2 extends so that the said rod 15 is connected to the said bar 2 for longitudinally sliding movement. The outer end of the rod is provided with a pair of lugs 18 which are on opposite sides of the bill 14 and are pivotally connected to said bill as at 19, the said pivot being at a suitable distance from the pivot 13. A spring 20 which is here shown has a coil spring connecting the bar 2 and the rod 15 serves to normally maintain said rod 15 in the position required to put the bill 14 in operative position for engagement with a bale, the bolt 9 by engagement with the arm 16 of said rod 15 serving to normally lock said rod 15 in such position.

In use, my improved hand hook is wielded in the ordinary way to cause the bill 14 to enter a bale and for the purpose of moving a bale and when it is desired to disengage the hook from the bale the user by means of the thumb latch 8 moves the bolt 9 out of engagement with the arm 16 which forms a stop element of the rod 15 and he then pulls forward on the handle, thereby causing the rod 15 and the bill of the hook to yield against the tension of the spring 20 and hence the bill of the hook becomes extricated from the bale and the user is not required to push the hook rearwardly in order to thus extricate it from the bale. Hence my improved hand hook may be released from the bale very much more quickly and with greatly less effort than the common form of hand hook in which the bill of the hook is immovable with relation to the handle.

It will be understood that as soon as the hook has been thus disengaged from the bale, the spring 20 restores the rod 15 and the bill to their initial position and the spring actuated bolt 9 reëngages the stop arm 16 of said rod 15 and hence locks the bill automatically in initial position.

I do not desire to limit myself to the precise construction and arrangement of devices herein shown and described as it is evident that modifications may be made therein within the scope of the appended claims.

What is claimed is:—

1. In a device of the class described, the combination of a handle having a bar extending therefrom, a bill or hook element pivotally connected to said bar, a rod pivotally connected to said bill or hook element and slidably connected to said bar, means to lock said hook element in one position and means to actuate said locking means.

2. In a device of the class described, the combination of a handle having a bar extending therefrom, a bill or hook element pivotally connected to said bar, a rod pivotally connected to said bill or hook element and slidably connected to said rod, a spring pressed bolt to normally lock said rod and hook element in one position and means to disengage said bolt.

3. A device of the class described comprising in combination with a handle having a rod extending therefrom, a guide element spaced from said rod at the base thereof and a stop shoulder, a thumb latch pivotally connected to said handle, a bolt guided in said guide lug and pivotally connected to said thumb latch, a spring to normally keep said bolt in locked position, a bill or hook element pivotally connected to said bar, a rod pivotally connected to said bill or hook element and having a stop arm slidably connected to said bar and a spring to normally maintain said rod and bill or hook element in such position as to cause the bolt by co-action with said stop element to lock said rod and hence also said bill or hook element.

In testimony whereof I affix my signature in presence of two witnesses.

HERBERT A. WATERMAN.

Witnesses:
L. P. SPRINGER,
W. A. MARTIN.